June 11, 1940.  H. A. HUSTED  2,203,787
MOLDING MEANS FOR MAKING THERMOPLASTIC ARTICLES
Filed Oct. 31, 1935  5 Sheets-Sheet 1

INVENTOR
HARRY A. HUSTED
BY
Justin W Macklin
ATTORNEY

June 11, 1940.  H. A. HUSTED  2,203,787
MOLDING MEANS FOR MAKING THERMOPLASTIC ARTICLES
Filed Oct. 31, 1935   5 Sheets-Sheet 2

INVENTOR
HARRY A. HUSTED
BY
Justin W. Macklin
ATTORNEY

June 11, 1940.    H. A. HUSTED    2,203,787
MOLDING MEANS FOR MAKING THERMOPLASTIC ARTICLES
Filed Oct. 31, 1935    5 Sheets-Sheet 3

INVENTOR
HARRY A. HUSTED
BY
ATTORNEY

June 11, 1940.   H. A. HUSTED   2,203,787
MOLDING MEANS FOR MAKING THERMOPLASTIC ARTICLES
Filed Oct. 31, 1935   5 Sheets-Sheet 4

INVENTOR
HARRY A. HUSTED
BY
ATTORNEY

Patented June 11, 1940

2,203,787

UNITED STATES PATENT OFFICE 2,203,787

MOLDING MEANS FOR MAKING THERMOPLASTIC ARTICLES

Harry A. Husted, Sandusky, Ohio, assignor, by mesne assignments, to The Standard Products Company, Port Clinton, Ohio, a corporation of Ohio Application October 31, 1935, Serial No. 47,655

5 Claims. (Cl. 18—42)

This invention relates to a mold for applying thermoplastic materials to previously constructed metal articles. It is particularly adapted for applying thermoplastic of the nature, for example, of cellulose acetate, to metal frames of automobile steering wheels or the like.

In such uses, great difficulties have been encountered in applying the necessary pressure and heat treatment without distortion of the metal core, and without unnecessary overflow or waste of the material.

An object of this invention is to provide a simple, effective molding device which shall be capable of retaining the material to be applied to the metallic core, preventing its escape and thus maintaining the necessary high pressure. Further objects include the provision of means for quickly heating and cooling the molding apparatus.

More specific objects include the provision of a mold capable of applying plastics by molding under pressure and by the application of heat to the desired temperature most effectively, efficiently, and with great rapidity of operation.

In the manufacture of many types of automobile steering wheels, it has been desired, and has long been the practice, to mold the plastic material over a metal frame.

Attempts for a number of years to mold cellulose esters, particularly cellulose acetate, have resulted in failure to cause complete union of this material into one solid integral enveloping mass. Moreover, a frequent difficulty is that the final result presents unwelded seams which crack open under ordinary temperature changes. Furthermore, in attempts to use the material in powdered form and then heating and applying the pressure, the result has usually been one of a porous or granular coating of insufficient solidarity and stability.

In my prior applications Serial No. 736,484, filed July 23, 1934, now Patent No. 2,146,703, issued February 7, 1939, and Serial No. 731,933, filed June 22, 1934, now Patent No. 2,001,349, issued May 14, 1935, I have shown methods of applying cellulose acetate to a hollow frame or spider of a steering wheel including hub, rim and spokes. Prior to my practice of those inventions, attempts have been made to apply cellulose acetate to somewhat similar hollow rims and spokes of steering wheels. In attempting to cause complete welding of the particles or parts of the stock of cellulose acetate, pressures have been tried so great as to crush or distort the tubing forming the rim and spokes, but without uniform success.

The problem has been further complicated by the present demand for steering wheels of the so-called "banjo" type, in which the spokes comprise a plurality of spring steel wires which are left exposed while the rim is coated with a plastic material, and the hub may or may not be similarly coated. The principal difficulty is to apply the cellulose acetate to the rim while confining it from flow along the spokes and while still maintaining the necessary high pressure upon the material itself.

The present invention accomplishes the applying of cellulose acetates to a hollow rim carried upon a plurality of such wire spokes, and at the same time to coat a hub and form cross members embracing the spokes, if desired.

A further object of the invention is to provide from proper positioning of such a metal frame in the mold and from ejecting the same without damage thereto after the formation of the cellulose acetate thereon.

Further objects include the construction of the mold so as to make possible the bringing of heating and cooling fluids into the closest practicable application to the zone of the parts to be heated, that is, the parts to which the plastic material is to be applied.

I am aware that others have previously constructed spring steel wire spoke wheels and have molded materials such as rubber thereon, but in connection with the present invention I have devised a particular type of metallic frame for such wheels, which forms the subject of my application Serial No. 52,158, filed November 29, 1935.

The method of accomplishing the above and other objects will become apparent from the following description which relates to the accompanying drawings, in which.

Figure 1:
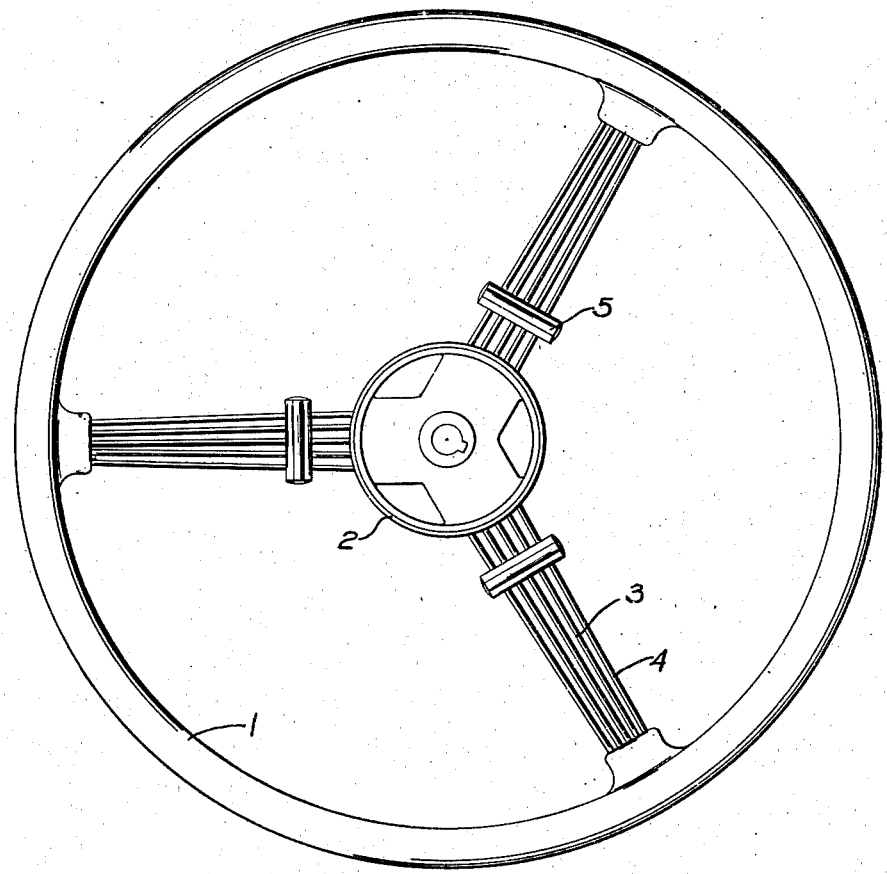
Fig. 1 is a plan view of the completed wheel without its horn button and ring.
Figure 2:
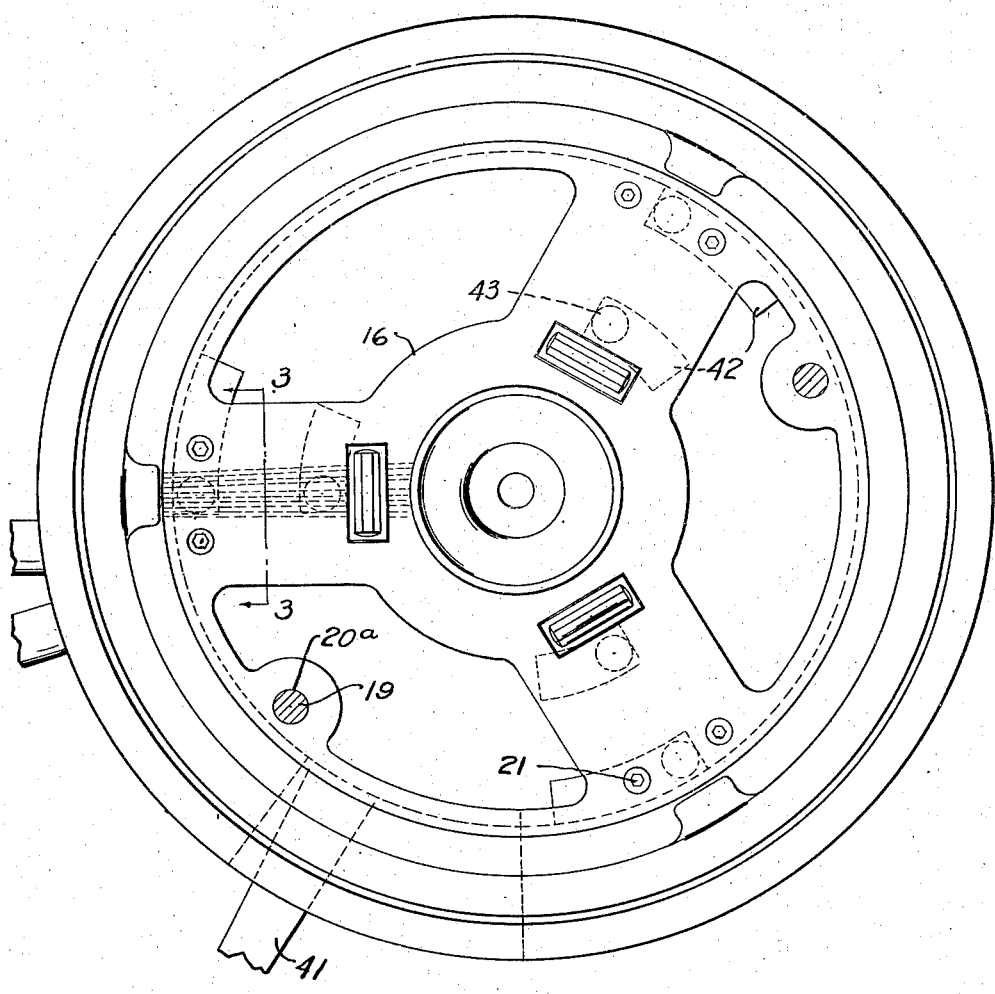
Fig. 2 is a plan view of the lower half of the mold of this present invention.

Referring to Fig. 1, the steering wheel is shown comprising a rim 1 and a hub 2 which are joined together by means of spokes 3. Each spoke includes a plurality of spring steel wires 4 which are permanently secured to the hub and rim. Molded to each composite spoke is an ornament 5 which is directed transversely to the spoke wires.

Figure 4:
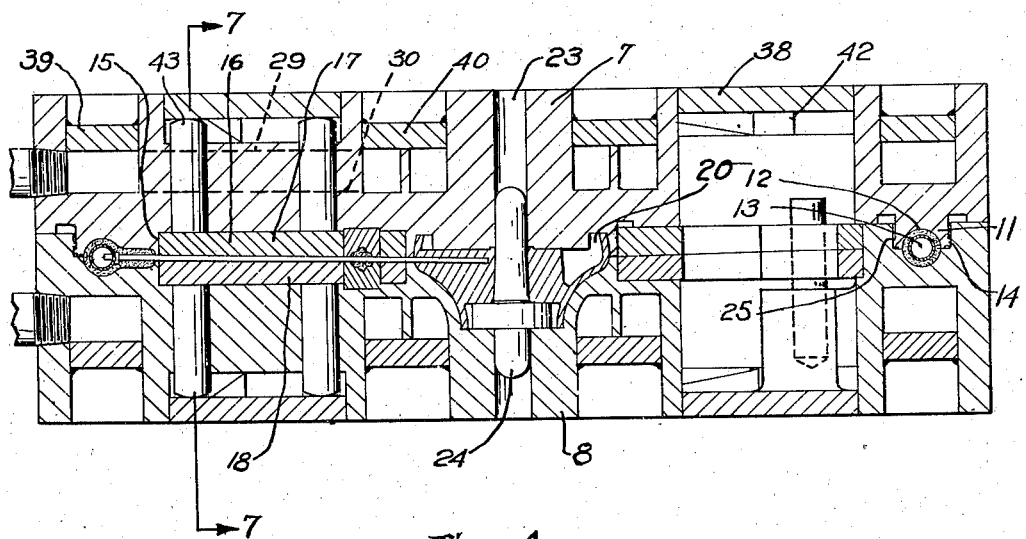
Fig. 4 is a vertical section through the center of the mold, showing the applying of the material to the frame in position therein.
Figure 5:
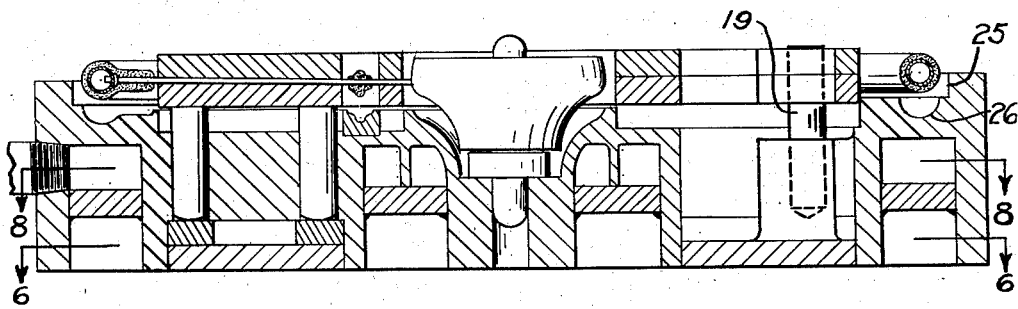
Fig. 5 is a similar view of the lower half of the mold, showing the action of the ejecting means.
Figure 6:
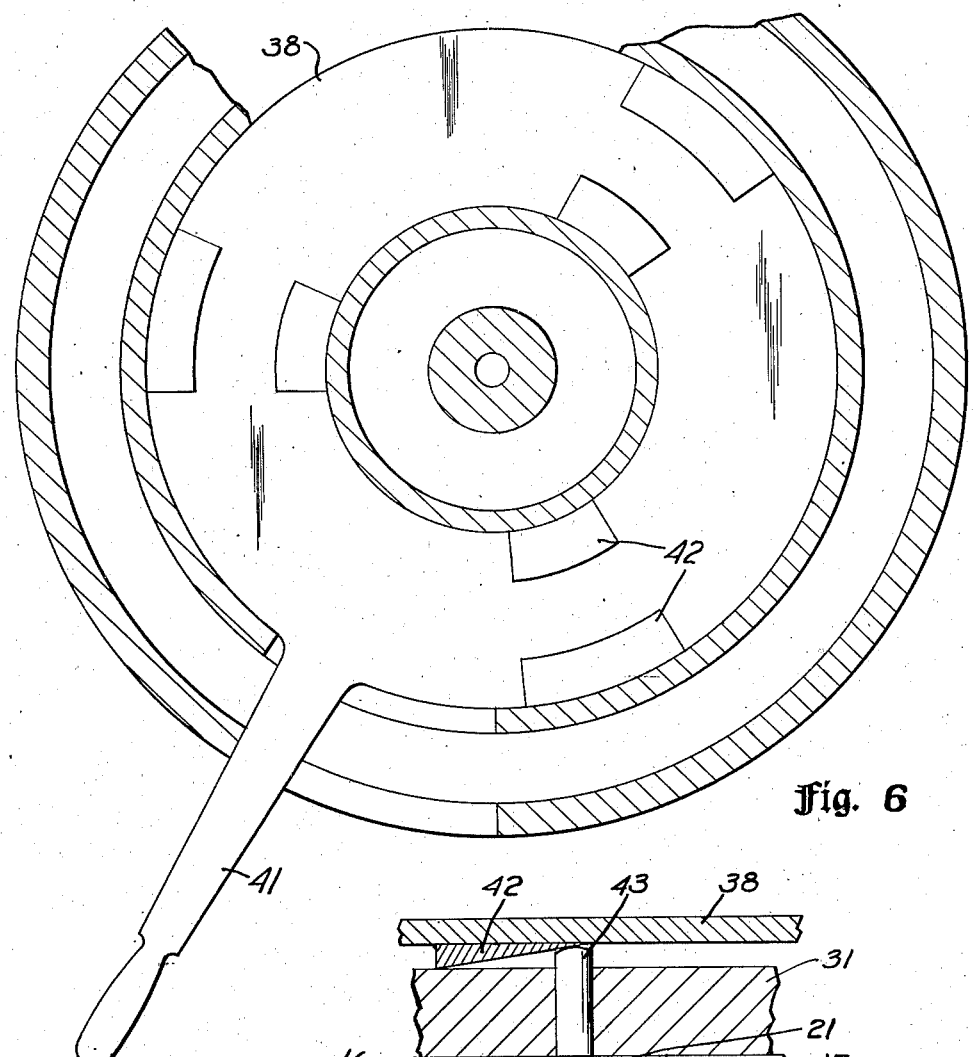
Fig. 6 is a sectional plan taken substantially on a plane indicated by the line 6—6 of Fig. 5.

In Figs. 4 and 5 is shown the mold for applying the thermoplastic material to the steering wheel. This mold comprises an upper portion 7 and a lower portion 8, each of which is capable of being mounted on the platens of a standard press. Basically, the upper and lower portions of the mold are the same. Therefore, the upper portion will be described in detail and the differences between the upper and lower portions brought out later.

The upper portion 7 is provided with an annular projection 11 which extends below the bottom face thereof. Formed in the face of projection 11 is a recess 12 which defines half of the wheel rim cavity 13. Shoulders 14 around the sides of projection 11 serve as a bearing surface and a seal to prevent the escape of excess quantities of plastic material and thus maintain the high pressure during the molding operation. In the center of portion 7 a further recess 20 is formed and adapted to receive the upper portion of the hub 2 of the steering wheel.

While the drawing shows substantially a solid metal hub, it should be understood that by slightly reducing the size of the hub a cavity may be formed around the hub for the purpose of applying a coating of plastic material thereto.

Figure 3:
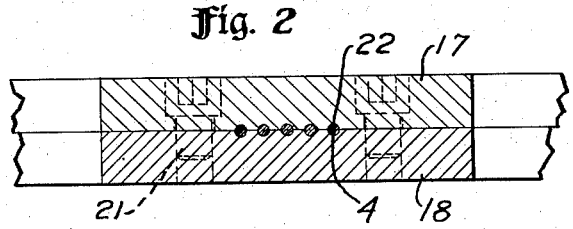
Fig. 3 is a detail section taken on the line 3—3 of Fig. 2.

Another annular recess 15 on the upper portion 7 is adapted to receive a ring plate clamp 16 for the spokes which is made up of elements 17 and 18. These elements are removably joined together in any convenient manner as by screws 21. Each wire 4 of spokes 3 is rigidly held in place by grooves 22 formed in the engaging faces of elements 17 and 18 when the screws 21 are drawn up tightly, as indicated in Fig. 3.

The clamp 16 is removably held in a definite relation to the mold by dowel pins 19 which project through drilled holes 20a in the clamp. The dowels 19 are preferably pressed into tight fitting holes in the lower portion 8 and are allowed to project above the surface of the portion 8.

A hole 23 drilled in the center of portion 7 forms a guide into which the pilot 24 extends. This pilot serves to align both portions 7 and 8 during the setting of the press and also to locate the wheel frame or core in the center of the mold cavity.

Referring now to the lower portion 8 of the mold, the numeral 25 indicates an annular recess which is adapted to receive the projection 11. Sufficient clearance should exist between the side walls of the recess 25 and the shoulders 14 to prevent excess wear thereof and still prevent the loss of plastic material during the molding operation. The remaining half of the cavity 13 is defined by recess 26 which is formed in the bottom of recess 25. The lower portion of the hub 2 fits into a depression at the center of the portion 8 and, like the recess 20, may be used as a mold for coating the hub with plastic material.

Figure 8:
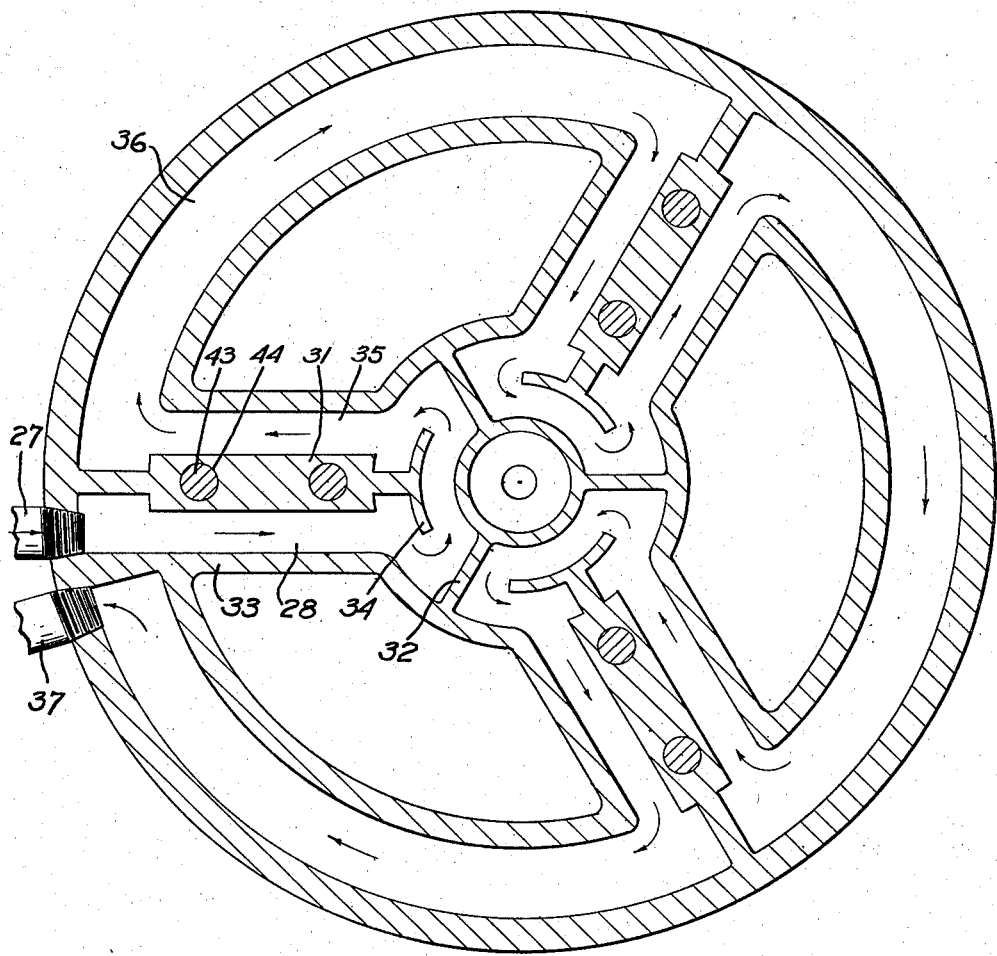
Fig. 8 is a horizontal cross section showing the fluid circulation passages, being taken substantially on the line 8—8 of Fig. 5.

In Fig. 8, which shows a typical section through the fluid passages of the mold in either portion 7 or 8, the numeral 27 refers to an inlet pipe which may be threaded or otherwise joined to the side of portion 7 and enters a fluid passage shown at 28. This passage is defined horizontally by walls 29 and 30 and vertically by a central partition 31, and partition 32, and side partition 33. The central partition 31 is joined at one end to the outside wall of the portion 7 and the other end terminates in a baffle 34. Passage 28 conducts the fluid toward the center of the mold to partition 32 which causes a reversal of flow through a similar passage 35 located on the opposite side of the central partition 31.

Passage 35 opens into a circular channel-shaped passage 36 which, in turn, adjoins further passages similar to 28 and 35 but angularly disposed therefrom. The size of the circular passage 35 is definitely fixed and determined by a ring as at 39 which is suitably joined to the side walls of the passage 35 so as to form a fluid-tight chamber within the mold portions. Likewise the central or hub portion of the mold in the vicinity of the baffles 34 and partitions 32 is provided with a ring indicated by 40 to form the enclosing wall of the chamber adjacent the passages 28.

It should be noted that passages 28 and 35 lie substantially parallel to the spokes 3 of the wheel as it lies in the mold and that passages 36 are vertically adjacent and substantially concentric with the rim cavity 13. The fluid is permitted to exhaust through an outlet pipe 37 which is located at the end of the last circular passage. Thus the fluid enters through the inlet pipe 27 and proceeds along a series of adjoining passages around the mold and exhausts through the outlet pipe 37.

Figure 7:
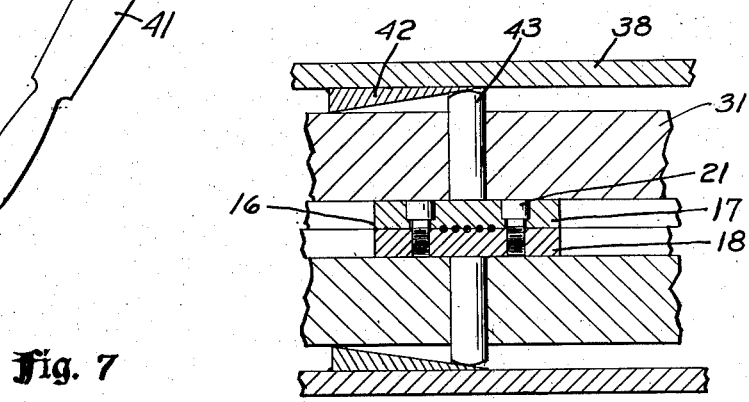
Fig. 7 is a sectional detail through the upper and lower sections of the mold, the location of the section being indicated by the line 7—7 of Fig. 4.

To facilitate the removal of the wheel from the mold, each portion 7 and 8 is provided with an ejecting ring as shown at 38 which is capable of being rotated through a small arc about the center of the mold by means of a handle 41. Referring to Fig. 7, the rings 38 are shown provided with cams 42 which are welded or otherwise suitably mounted thereon. These cams are adapted to engage ejecting pins as at 43 which, in Fig. 8, are shown passing through openings 44 in partition 31 and contacting the spoke ring plate clamp 16.

The upper portion 7 of the mold is mounted on the ram platen of a press and is capable of moving into and out of engagement with the lower portion 8 which is mounted on the stationary platen of the press. The mold may be charged with a preformed quantity of plastic material which is placed in all cavities of the mold. Then a wheel core, with the ring plate clamp 16 fitted in place, is dropped over the pilot 24 which centers the wheel laterally with respect to all cavities. The ram platen carrying the upper portion 7 of the mold is then lowered so that the projection 11 on the portion 7 enters the recess 25 in the portion 8. As the two portions 7 and 8 are closed to the limit shown in Fig. 4, the plastic material is forced to flow, under the influence of high pressure, into every corner of the mold cavity. If a more complete description of methods of adding the plastic material is desired, it can be found in my prior United States Patent No. 2,146,703 hereinbefore mentioned.

Attention is directed to the fact that the clamping plate 16 locates the vertical center, that is, the plane of the rim and spokes, of the wheel with respect to the mold cavity. Thus the portion to be covered is centralized in two directions, which insures the formation of a thin veneer of uniform thickness around the core.

While the mold is still closed, hot fluid preferably steam at a temperature say of 250° F. to 290° F. is injected and circulated through the fluid passages, as shown by arrows in Fig. 8. During rapid production, however, the steam may be passed through the mold prior to the closing operation in order for the cavity walls to more quickly reach the proper high temperature, of about 250° to 275° F. when treating cellulose acetate, after the mold is closed.

The fluid passages are designed and arranged to be as near the zone of the cavities as possible to insure a rapid and uniform heat transfer through the passage walls and partitions. The steam is allowed to flow through the passages for a period of about forty to eighty seconds, during which time the plastic material definitely assumes the shape of the mold. The steam is then cut off and a cooling fluid such as cold water circulated through the passages until the temperature of the wheel is below 150°. This cooling process permanently sets the material and facilitates the ejecting operation.

When the desired low temperature is reached, the ram of the press is retracted, which loosens the wheel from either the upper or lower portion of the mold. Then by turning the handle 41 on that portion of the mold in which the wheel remains so that the cams push the ejecting pins 43 against the ring plate clamp members 16, the finished wheel is drawn, without injury to the surface, from the mold. The ejecting pins move simultaneously so that the wheel is not allowed to cock and bind during the drawing operation.

From an examination of Figs. 4 and 5 it will be noticed that the ring plate clamp 16 gives rigid support to the entire length of each spoke so that during the ejecting operation the force required to dislodge the wheel from the mold is uniformly distributed along each spoke. Moreover the ring plate clamp is sufficiently rigid to prevent bending or warping or otherwise deforming the wire spokes during either the molding or ejecting operation.

Prior to this invention the ejecting pins were placed at various positions in the cavity of the mold and were made to directly contact the molded article during ejection. As a result inherent depressions or undesirable marks occurred on the surface of the article at the location of these ejecting pins so that a finishing operation was necessary to eliminate these marks. The ejecting pin, as shown in the present invention, can not directly contact the molded surface to cause such marks.

In molds of the present type it is extremely essential to maintain the positive high pressure effect throughout the entire cavity because if a leak or flash occurs at any point in the mold the result is a pitted or roughened surface of the article at the location of the flash.

Furthermore, if a flash occurs it means a waste of cellulose acetate material which is relatively expensive, and a small loss at each molding operation will amount to an appreciable financial loss on a large order.

The ring plate clamp 16 thus serves to positively retain the plastic material at the junction of the spokes with the rim and hub and the projection 11 likewise seals the material around the rim.

While I have shown and described but one form of my invention, I do not intend to be limited thereto since it will be apparent to those skilled in the art that other modifications may be made without departing from the spirit and scope of the invention as set forth in the hereunto annexed claims.

Having thus described my invention, what I claim is:

1. A mold for applying a coating of thermally moldable material to the surface of a preformed article, said mold comprising separable engageable portions which are relatively recessed to form a cavity, means in said portions for accurately positioning said article with respect to said cavity, said means including elements mounted on said article and engageable with said portions, and further means in said portions for engaging said elements to eject said article from said portions.

2. A mold for applying a layer of thermally moldable material to the surface of a preformed article, said mold comprising engageable portions which are relatively recessed to form a cavity, means in said portions for accurately positioning said article with respect to said cavity, further means in said portions for ejecting the completed article from said portions, said further means including a moveable plate, pins engageable with said first means, and cams on said plate engageable with said pins.

3. A mold for applying a coating of thermally moldable material to the surface of a preformed article, said mold comprising engageable portions which are relatively recessed to form a cavity, means in said portions for accurately positioning said article in all directions with respect to said cavity, said means comprising a pair of elements mounted on said article and a pilot engageable with each of said portions and said article, and further means in said portions engageable with said first means for ejecting said article from said portions.

4. A mold for applying a relatively thin, approximately uniform coating of thermally moldable material to envelop a preformed article, said mold comprising engageable portions which are relatively recessed to form a cavity, interengageable surfaces on said portions surrounding said cavity to provide a seal for the moldable material in the zone around said cavity, means in said portions for centralizing said article with respect to said cavity, and further means in said portions engageable with the first means for ejecting said article from said portions.

5. A temperature controlled positive compression type mold for applying thermally moldable material in a thin uniform integral coating to the rim annulus of a rigid preformed metallic automobile steering wheel spider, said mold comprising separable mold blocks, each adapted to be carried by platens of a high pressure press, said blocks having recesses forming a cavity, coacting surfaces on said mold blocks adjacent the cavity, said surfaces serving to confine the thermally moldable material to the zone of the cavity while the mold blocks are being closed, thermal fluid conducting passages in said blocks in close uniform proximity with the recesses and extending along the recesses and transversely of them in radial directions to expedite uniform heat transfer to the cavity.

HARRY A. HUSTED.